3,833,658
2-HYDROXY-4-PHENOXYBENZOPHENONE
COMPOUNDS
Lajos Avar, Binningen, Basel-Land, and Kurt Hofer,
Munchenstein, Basel-Land, Switzerland, assignors to
Sandoz Ltd., Basel, Switzerland
No Drawing. Filed Aug. 17, 1971, Ser. No. 172,588
Claims priority, application Switzerland, Aug. 28, 1970,
12,886/70
Int. Cl. C07c 49/80, 49/82
U.S. Cl. 260—591          12 Claims

ABSTRACT OF THE DISCLOSURE

The purpose of this invention is to render accessible 2 - Hydrox - 4' - phenoxybenzophenone, unsubstituted or substituted by alkyl or alkoxy radicals or by halogen, which compounds absorb ultraviolet rays and protect light-sensitive organic materials, notably plastics, from the detrimental action of this radiation.

---

This invention relates to a process for the production of 2 - hydroxyl-4'-phenoxybenzophenone compounds of formula

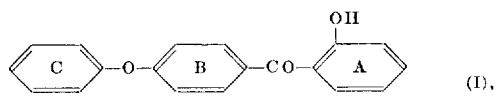
(I), in which the benzene nucleus A may be substituted by the methyl group and the benzene nuclei B and C by halogen or by alkyl or alkoxy radicals which may be further substituted. The process is characterized by the Friedel-Crafts condensation at temperatures below 50° C., of 1 mol of diphenylether, which may be substituted by halogen or optionally substituted alkyl or alkoxy radicals, with 1 mol of a compound yielding the radical of formula

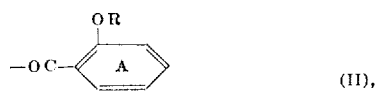
(II), where R represents lower alkyl, with subsequent heating of the reaction mixture to replace the alkyl radical R by hydrogen. The diphenylether used as starting material is preferably unsubstituted as the final compounds obtained thereby are particularly effective in polypropylene as stabilizers against the action of ultraviolet radiation. Valuable stabilizers for polyvinyl chloride and polyethylene can also be obtained from substituted diphenylether. The one benzene nucleus in the diphenylether can be substituted one to three times by halogen, alkyl or alkoxy radicals, while the other benzene nucleus is preferably unsubstituted; the latter may however bear one substituent, for example an alkyl or alkoxy radical.

Examples of suitable alkyl radicals are methyl, ethyl, propyl, isopropyl, butyl, tert.butyl, n-amyl, n-octyl, 2-ethylhexyl, tert.octyl, 2,6,8-trimethyl-4-nonyl, iso-octyl, n-decyl, n-dodecyl, cetyl, stearyl, docosanyl (behenyl).

Examples of alkoxy radicals which may occur in the diphenylether are methoxy, ethoxy, propoxy, iso-propoxy, n-butoxy, n-hexyloxy, n-dodecyloxy and 2-ethylhexyloxy.

The halogen atoms present as substituents in the diphenylether are preferably chlorine and bromine, more especially chlorine.

The intermediates required for producing the disclosed compounds are in part known from the literature:

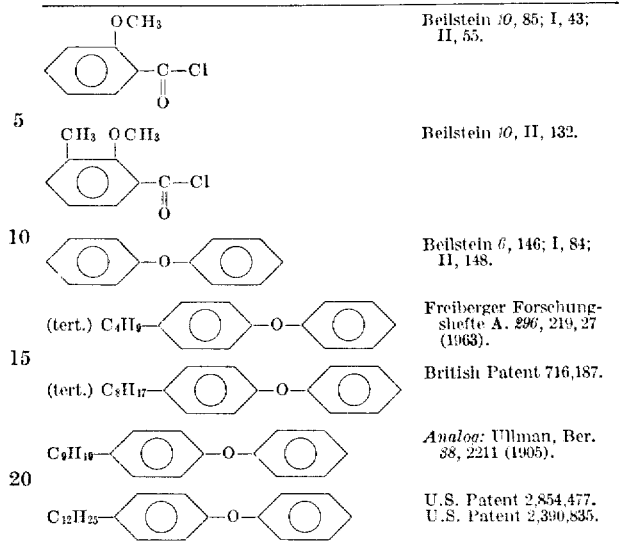

The new process is carried out in two stages. In the first stage condensation to a 2-alkoxybenzophenone is carried out under waterfree conditions in the known manner after Friedel-Crafts (cf. Olah, "Friedel-Crafts and Related Reactions" (1964) and the Merck Index, 7. Ed. p. 1428 (1960)). In the second stage the alkoxy group is converted into the hydroxyl group. The Friedel-Crafts condensation reaction has to be carried out under mild conditions so that no change takes place in the alkoxy group —OR in formula (II). The known Friedel-Crafts catalysts can be employed, e.g. tin tetrachloride, iron (III) chloride, aluminum bromide, aluminum chloride, adducts of aluminium chloride on alkali-metal chlorides (NaCl, KCl, LiCl), notably $AlCl_3$, in inert organic solvents such as carbon disulphide, di-, tri- or tetra-chloromethane, dichloro or tetrachloro-ethane, chlorobenzene, bromobenzene, ortho-dichlorobenzene, nitrobenzene, or in an excess of the unsubstituted or substituted diphenyl ether. The conditions are sufficiently mild when a working temperature below 50° C., preferably between —10° and +25° C., is maintained.

In the second stage of the process the 2-alkoxybenzophenone is converted into the 2-hydroxybenzophenone. This could be accomplished by acid hydrolysis, e.g. by treatment with hydrobromic acid in an anhydrous lower alkanecarboxylic acid such as anhydrous propionic acid or in glacial acetic acid at temperatures ranging from room temperature to the boiling point of the mixture, preferably at 60° to 100° C. But it has been found that it is possible to dispense with working up after the first stage and the use of reagents for the second stage. It is sufficient to heat up the reaction mixture on completion of the first stage, e.g. to 50–100° C., in order to carry out the second stage, in which the radical R is converted into the corresponding alkyl halide and the hydroxyl group in the 2-position of the benzophenone set free. For working on these lines it is advisable to select for the Friedel-Crafts condensation an inert organic solvent which has its boiling point at 100° C. or above.

The ortho-hydroxybenzophenones thus formed are isolated by the normal method, the first step being decomposition of the resulting metal complex by bringing it into an aqueous and at the same time acid phase. The crude compound then obtained can be purified by re-crystallization from alcohol, ethyl acetate, methylethyl ketone, toluene, benzine, or by washing out in a suitable organic solvent.

This invention relates further to the new compounds of formula (I). The 2-hydroxy-4'-phenoxybenzophenone compounds of formula (I) which are of special interest are those in which the benzene nucleus B is unsubstituted, the benzene nucleus A may bear a methyl group and the benzene nucleus C may bear one or more alkyl groups having in all up to 18 carbon atoms.

Also of interest are the compounds of formula (I) wherein the phenylene nucleus B is unsubstituted or substituted by a lower alkyl or alkoxy group; and the phenyl nucleus C is substituted by 1 alkoxy and/or 1 or 2 alkyl groups, the substituents on the phenyl nucleus C having in all up to 18 carbon atoms, particularly compounds in which the phenylene nucleus B is unsubstituted or substituted in the 2'-position by a lower alkyl group and the phenyl nucleus C is substituted by an alkyl group having up to 18 carbon atoms.

Especially preferred compounds are those in which the nuclei B and C are unsubstituted and the nucleus A is substituted by a methyl group in the 3-, 4-, or 5-position.

The invention comprises further the use of the new compounds of formula (I) as ultra-violet absorbers for organic materials. For this purpose they are incorporated in substances sensitive to ultra-violet radiation, or applied to the surface of such substances to form a protective film. By absorbing the detrimental ultraviolet rays the disclosed compounds safeguard these substances from degradation.

The compounds of formula (I) have diverse applications in plastics technology, being suitable for use in many materials including cellulose acetate, cellulose acetobutyrate, polyethylene, polypropylene, polyvinyl chloride, polyvinyl chloride acetate, polyamides, polystyrene, ethyl cellulose, cellulose nitrate, polyvinyl alcohol, silicon rubber, cellulose propionate, melamine-formaldehyde resins, urea-formaldehyde resins, allyl casting resins, polymethyl methacrylate, polyesters and polyacrylonitrile.

Natural materials such as rubber, cellulose, wool and silk can be protected against ultra-violet radiation in the same way.

The materials to be protected may be present as film, sheet, panels, rods, tapes, coatings, fibres, granules, powders, in other solid forms or as solutions, emulsions or dispersions. The disclosed compounds are incorporated in or coated on the materials by standard methods. An important method of application consists in intimately mixing the compound with the material, for instance polypropylene granules, in a kneader or other suitable machine, with subsequent extrusion. In this way very homogeneous mixing is obtained which is important for good protection. The material may be extruded, for example, in the form of film, tubing or filament, the latter for processing as textile fabric. In this procedure the ultra-violet absorber is blended with the polypropylene before its conversion into textile fabric. But formed textile yarns and fabrics also can be treated with the new ultra-violet absorbers, for example by application from superfine dispersion in water. Textiles of polyethylene terephthalate and cellulose acetate fibres are suitable for this exhaust method of application.

Plastics materials and synthetic fibres need not necessarily be present in the form of the final polymer before the new compounds are incorporated in them. The compounds can if desired be mixed with the monomers or prepolymers prior to synthesis of the polymer.

In addition to clear films, plastic products and the like, the disclosed ultra-violet absorbers can be used to stabilize opaque, semi-opaque and translucent materials with a surface susceptible to degradation by ultra-violet rays. Examples of such materials are foamed plastics, opaque films and coatings, opaque papers, opaque and transparent coloured plastics, fluorescent pigments, automobile and furniture polishes, creams, lotions and the like, regardless of whether they are opaque, clear or translucent.

The compounds of formula (I) can be employed in combination with other ultra-violet absorbers and stabilizers. Such mixtures of active substances often have a synergic action and protect the treated materials simultaneously against ultra-violet radiation, heat and oxidative degradation.

For some purposes the new compounds are not incorporated directly in the materials or coated on them to provide protection against ultra-violet radiation. Light-sensitive foods, for instance, such as fruits, cooking fats and butter can be protected by wrapping in plastic film containing a compound of the disclosed type.

This invention relates further to the materials containing compounds of formula (I) for protection against ultra-violet radiation. As indicated in the few examples mentioned above, they can be incorporated in the material at any stage of processing using standard methods, and the amounts may vary within wide limits, e.g. from 0.01 to 5% or preferably 0.05 to 1% relative to the weight of the material for protection.

In the following Examples mp stands for melting point, bp for boiling point and λ for wavelength. The parts and percentages are by weight and the temperatures in degrees centigrade.

EXAMPLES OF THE PROCESS OF PRODUCTION

Example 1

187 Parts of diphenylether and 171 parts of 2-methoxybenzoyl chloride are dissolved in 1500 parts of chlorobenzene. The temperature is held at −9° to 0° with stirring, and 147 parts of anhydrous aluminum chloride are slowly added. This addition requires 30 minutes to 3 hours depending on how effectively the cooling system conducts off the heat of reaction. With the entry of the aluminium chloride acylation sets in with development of hydrogen chloride. When this falls off markedly the temperature is slowly increased to 20–25°, and after 2 hours it is increased further to 85–95° to split the methylphenyl ether. When the methyl chloride has been split off completely the reaction mixture is unloaded with stirring into a mixture of hydrochloric acid and ice, the aqueous layer separated and the organic layer washed with hot water till neutral. The chlorobenzene is distilled with vacuum and the residue recrystallized from methanol. The yield is 230–260 parts of pure 2-hydroxy-4'-phenoxybenzophenone. Its formula and melting point are given in the table below, followed by details of 14 other compounds produced in an analogous manner.

$$\underset{3'}{\overset{5'\ 6'}{\underset{C}{\bigcirc}}}_{2'}-O-\underset{}{\overset{}{\bigcirc}}_{B}-CO-\underset{6}{\overset{2\ 3}{\underset{A}{\bigcirc}}}_{5\ 4}^{OH}$$

| Example number | Substituents in the benzene nuceli A | Substituents in the benzene nuceli C | M.P., °C. | λ max., nm. |
|---|---|---|---|---|
| 1 | | | 75, 76 | 293 / 335 |
| 2 | | 4'-tert. butyl | 92, 93 | 295 / 335 |
| 3 | | 4'-n-nonyl | Oil | 295 / 335 |
| 4 | | 2',6'-dimethyl plus 4'-tert. butyl | 134, 135 | 292 / 335 |
| 5 | 3-methyl | | 43, 44 | 293 / 346 |
| 6 | 4-methyl | | 74, 75 | 292 / 338 |
| 7 | 3-methyl | 4'-(tert.)butyl | 104, 106 | 292 / 344 |
| 8 | 4-methyl | do | 82, 83 | 285 / 340 |
| 9 | 3-methyl | 4'-n-nonyl | Oil | 292 / 344 |
| 10 | | 4'-bromo | 76, 77 | 285 / 340 |
| 11 | | 4'-n-dodecyl | Oil | 293 / 330 |
| 12 | | 4'-methyl | 54, 55 | 292 / 332 |
| 13 | | 2',4'-di-(tert.)butyl | Oil | 297 / 335 |
| 14 | 3-methyl | 4'-(1,1,3,3-tetramethyl-butyl) | Oil | 293 / 345 |
| 15 | | do | 91, 93 | 294 / 333 |

EXAMPLES OF APPLICATION

A. Polyproplyene and 0.5% of the compound described in Example 2 are homogeneously mixed at 180° and extrusion moulded as panels of 0.3 mm. thickness. Other panels are moulded with the same polypropylene without an incorporated additive. The light stability of the panels is tested in the Klimatest apparatus by the De La Rue method at 40° and 75% relative humidity, with vigorous renewal of air and radiation by 16 Philips sunlamps and 16 blacklamps. After exposure for 100 hours the polypropylene panels without incorporated additive are brittle and show hair cracks. The panels containing the compound of this invention are unchanged after 700 hours exposure.

EXAMPLES OF APPLICATION

A. Polypropylene and 0.5% of the compound described in Example 2 are homogeneously mixed at 180° and extrusion moulded as panels of 0.3 mm. thickness. Other panels are moulded with the same polypropylene without an incorporated additive. The light stability of the panels is tested in the Klimatest apparatus by the De La Rue method at 40° and 75% relative humidity, with vigorous renewal of air and radiation by 16 Philips sunlamps and 16 backlamps. After exposure for 100 hours the polypropylene panels without incorporated additive are brittle and show hair cracks. The panels containing the compound of this invention are unchanged after 700 hours exposure.

As a stabilizer for polypropylene the compound described in Example 2 is superior to the benzotriazolyl stabilizers described in Ullmann, Enzyklopädie der technischen Chemie, third impression, Vol. 18, page 51 (1967).

B. Polyvinyl chloride and 0.5% of one of the compounds of Examples 1 or 6 are homogeneously mixed on a roller mill for 5 minutes at 160–190° and extrusion moulded as 0.3 mm. thick panels, while comparative panels are made from the same polyvinyl chloride without an incorporated additive. The light stability of the panels is tested in the Klimatest apparatus by the De La Rue method at 40° and 75% relative humidity, with constant renewal of air and radiation by 16 sunlamps and 16 backlamps of Philips manufacture. After exposure for 300 hours the panels without protective additive are brown and cracked. The panels containing one of the compounds according to this invention withstand 300 hours exposure without adverse effect.

C. A wood varnish of the following composition is made:

18.00% cellulose acetobutyrate
2.00% dibutyl phthalate
20.70% butyl acetate
33.40% xylene
8.35% methyl iso-butyl ketone
8.35% cyclohexanone
9.20% n-butanol The varnish is applied to bleached maplewood veneer and the veneer exposed to light in the Fadeometer apparatus. After 20 hours brownishness appears. If the varnish of the above composition is mixed with 0.6% of the compound specified in Example 7, the varnished veneer remains unchanged after 80 hours exposure in the Fadeometer.

D. A nitrocellulose combination lacquer for wood is prepared, its composition being:

13.0 parts of ester soluble nitrocellulose chips containing about 18% of a dialkylphthalate plasticizer (NC chips E 250/D 18 of the firm Worbla, Berne, Switzerland).
18.0 parts of a peanut oil modified alkyd resin with an oil content of about 41% and a phthalic anhydride content of about 33% (Alkydal E 41 70% in toluene of Farbenfabriken Bayer, Leverkusen, West Germany).
1.5 parts of dioctyl phthalate
20.0 parts of ethyl acetate
5.0 parts of 2-ethoxyethanol
5.0 parts of n-butanol
15.0 parts of n-butyl acetate
6.0 parts of xylene
19.5 parts of toluene 100.0 parts   Solid content 25%

The lacquer is applied to bleached maplewood veneer, and the veneer exposed to light in the Fadeometer. After 20 hours pronounced yellowing is shown by the wood. If -% (relative to the solid content) of the compound of formula

(see example No. 5) is included in the lacquer of the above formulation, the lacquered wood withstands exposure for a much longer time before yellowing appears.

E. Poyethylene granules (Eupolen 2430 H of BASF) are mixed with 0.2% of an adhesive (Advawachs 360, a high-purity paraffin oil), the mixture transferred to a roller mill and milled with 0.5% of the compound of Example 15 for 5 minutes at 95–100°. The material is processed at 170° in an extrusion moulding machine as panels of 0.3 mm. thickness. Comparative panels are moulded with the same polyethylene, without ultra-violet absorber and with 0.5% 2-hydroxy-4-octyloxybenzophenone. The panels are tested as described in Application Example A. After 1500 hours the panels without ultra-violet absorber are cracked and brittle, those containing 2-hydroxy-4-octyloxybenzophenone are brittle after 3000 hours, while the panels with the incorporated compound of Example 15 are unchanged after 3000 hours.

Formulae of representative 2-hydroxy-4'-phenoxybenzophenone compounds of the foregoing examples are as follows:

Example 2

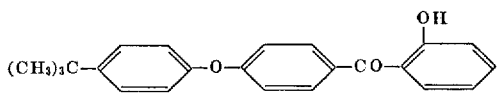

Example 4

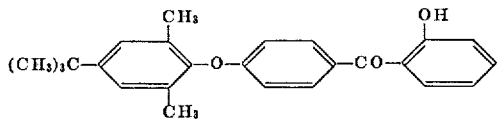

Example 9

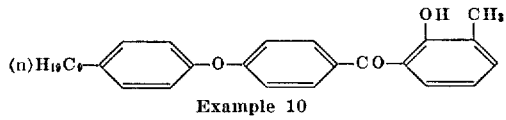

Example 10

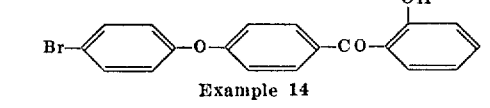

Example 14

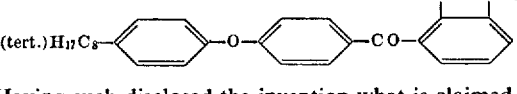

Having such disclosed the invention what is claimed is:
1. A compound of the formula

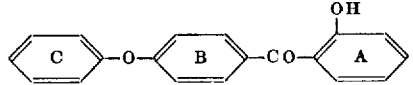

in which the phenyl nucleus A may be further substituted by a methyl group; and the phenylene nucleus B and phenyl nucleus C are unsubstituted or substituted by chlorine, bromine, alkyl of 1 to 20 carobn atoms or alkoxy of 1 to 12 carbon atoms.

2. A compound according to Claim 1 wherein the phenylene nucleus B is unsubstituted, and the phenyl nucleus C is unsubstituted or substituted by 1 or more alkyl groups having in all up to 18 carbon atoms.

3. A compound according to Claim 1 in which the phenylene nucleus B is unsubstituted or substituted by a lower alkyl or alkoxy group; and the phenyl nucleus C is substituted by 1 alkoxy group or by 1 or 2 alkyl groups or by 1 alkoxy group and 1 or 2 alkyl groups, these substituents on the phenyl nucleus C having in all up to 18 carbon atoms.

4. A compound according to Claim 1 of the formula

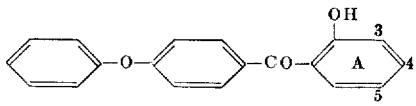

in which the phenyl nucleus A is substituted by a methyl group in one of the positions 3, 4 or 5.

5. 2 - hydroxy - 4' - phenoxybenzophenone according to Claim 1 of formula

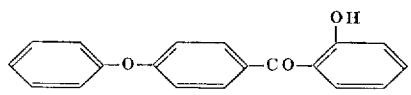

6. The 2-hydroxy-4'-phenoxybenzophenone compound according to Claim 1 of formula

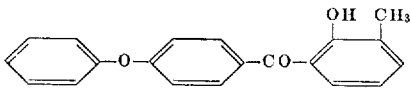

7. The 2-hydroxy-4'-phenoxybenzophenone compound according to Claim 1 of formula

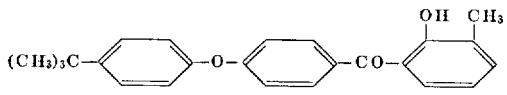

8. The 2-hydroxy-4'-phenoxybenzophenone compound according to Claim 1 of formula

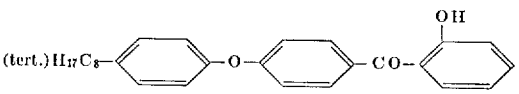

9. The 2-hydroxy-4'-phenoxybenzophenone compound according to Claim 1 of formula

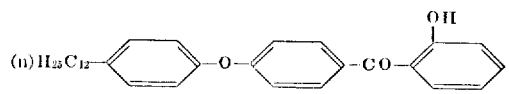

10. A compound according to Claim 3 in which the phenylene nucleus B is unsubstituted or substituted in the 2'-position by a lower alkyl group and the phenyl nucleus C is substituted by an alkyl group having up to 18 carbon atoms.

11. The compound according to Claim 1 of the formula

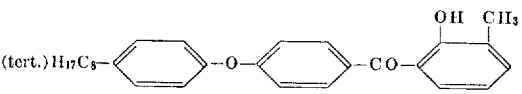

12. The compound according to Claim 1 of the formula

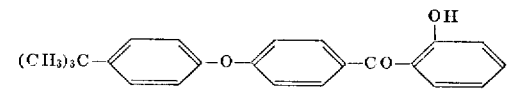

References Cited

UNITED STATES PATENTS

| | | | |
|---|---|---|---|
| 2,976,259 | 3/1961 | Hardy et al. | 260—591 |
| 3,146,269 | 8/1964 | Braus et al. | 260—591 |

DANIEL D. HORWITZ, Primary Examiner

U.S. Cl. X.R.

260—45.95, 814; 117—56, 138.5; 252—404